March 2, 1965 A. L. FRIEND 3,172,091

DIGITAL TACHOMETER

Filed May 12, 1961 2 Sheets-Sheet 1

INVENTOR
AARON L. FRIEND
BY
William C. Cahill

INVENTOR.
AARON L. FRIEND
BY
William C. Cahill

United States Patent Office 3,172,091
Patented Mar. 2, 1965

3,172,091
DIGITAL TACHOMETER

Aaron L. Friend, Phoenix, Ariz., assignor to General Electric Company, a corporation of New York
Filed May 12, 1961, Ser. No. 109,675
8 Claims. (Cl. 340—174.1)

This invention pertains to tachometers, and more particularly to apparatus for determining the acceptability of the velocity of an information storage media.

In data processing systems utilizing binary codes for the representation of information, the element of information, termed a "bit," is designated as a 1 or a 0. These binary bits are combined to form words which may represent numbers, letters, or other information. The storage of this information requires that the storage media be capable of retaining a measurable physical representation of each binary bit of the information word. For example, the word stored on or in the storage media must be capable of detection at each bit location as a binary 1 or 0. The information may be stored by the data processor in various ways, including magnetic tape, punch tape, magnetic drum, magnetic discs, etc.

These various storage media require relative motion between the storage media and the means used to write or read the information on the media. Since the data processing system is usually synchronized with the storage media, it is desirable to maintain the relative velocity of the storage media with respect to the write and read means within narrow limits.

Accordingly, it is the object of the present invention to provide an apparatus for determining the acceptability of the velocity of a storage media.

It is another object of the present invention to provide apparatus for determining the acceptability of the velocity of a storage media and rendering an electrical signal when the velocity does not fall within predetermined limits.

It is still another object of the present invention to provide an apparatus for determining the acceptability of the velocity of a storage media and rendering signals indicative of the acceptability or unacceptability of the storage media velocity.

Further objects and advantages of the present invention will become apparent as the description thereof proceeds.

Briefly, in accordance with one embodiment of the present invention, a write head is provided for writing a binary bit on a storage media. The write head is energized from an electronic counter which, after energizing the write head, begins counting at the rate determined by the receipt of clock pulses from a clock system. After a predetermined number of clock pulses, the counter generates a signal for energizing a timer circuit. The timer circuit is provided with a plurality of monostable circuits which are triggered to their unstable states upon receipt of the signal from the counter. The monostable circuits return to their stable states sequentially, and open corresponding gates for the receipt of a read signal from a read head. The read head is positioned with respect to the storage media to read the bit previously written by the write head; accordingly, when the bit is sensed by the read head, a read signal is produced and applied simultaneously to all of the gates associated with the respective monostable circuits. The read signal is passed by each gate (if enabled by their corresponding monostable circuits), and the combination of the signals from these gates thus represent the acceptability of the tape velocity and may be utilized to indicate media velocity, and may also be utilized to generate a control signal or signals for the adjustment of the media driving means.

The invention, both as to its organization and operation together with further objects and advantages thereof may best be understood by reference to the following description taken in connection with the accompanying drawings in which.

Figures 1, 2, 3:
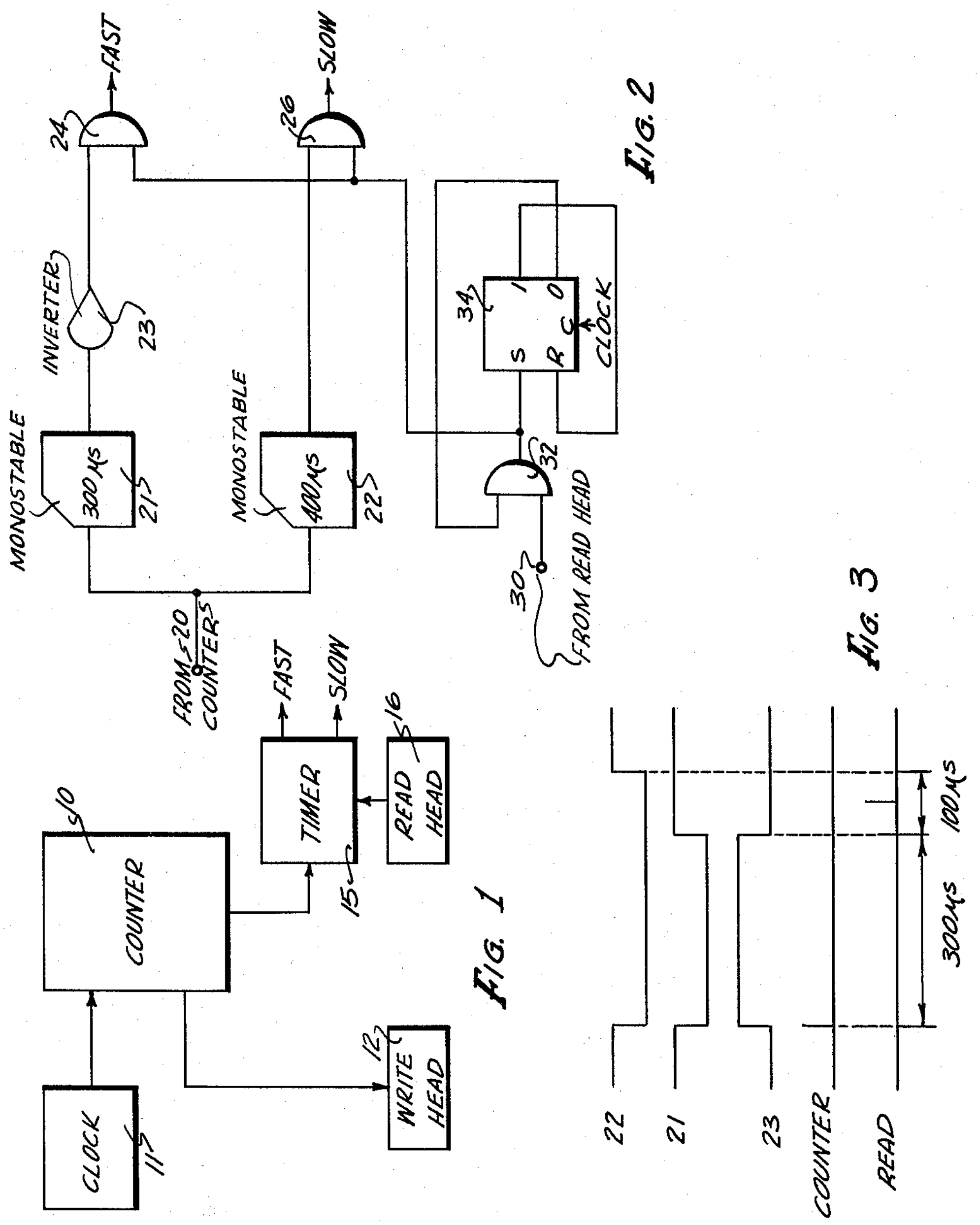
FIG. 1 is a block diagram of a digital tachometer incorporating the teachings of the present invention.
FIG. 2 is a logic diagram of a portion of the system of FIG. 1.
FIG. 3 shows a group of waveforms useful for the description of the operation of the logic diagram of FIG. 2.

Referring to FIG. 1, a counter 10 is shown for counting the clock pulses received from a clock system 11. The clock system may be any clock source; however, the clock system will usually be the clock of the data processing system in which the present invention is to be utilized. The counter 10 provides an energizing signal to a write head 12 for writing a binary bit on the storage media; simultaneously, the counter 10 begins counting a predetermined number of clock pulses. At the end of the predetermined number of clock pulses, a signal is provided by the counter 10 to a timer 15 which begins a timing cycle. A read head 16 is provided for sensing the bit recorded on the storage media by the write head 12. Upon the detection of the binary bit by the read head 16, a signal is supplied by the read head to the timer 15 wherein it is combined with other signals in the timer to produce signals indicative of the acceptability of the velocity of the storage media.

The timer 15 may be seen in detail in FIG. 2. In the embodiment shown in FIG. 2, the signal from the counter is connected through terminal 20 to two monostable circuits, 21 and 22. The monostable circuits 21 and 22 may be any type of timing device adapted to assume an unstable state for a predetermined time, and adapted to return to their stable states at the expiration of that time. The monostable circuits may conveniently be monostable multivibrators which may be fired to their respective unstable states by the application of a positive voltage level at the input terminal thereof. The output signals of the monostable circuits 21 and 22 are continuous positive voltage levels while the monostable circuits are in the stable state, and are negative voltage levels during the time that the respective circuits are in their unstable states. Monostable circuit 21 is connected through an inverter 23 to a logical gate 24. The inverter 23 may be any logical circuit for implementing the logical function of inversion. A positive voltage applied to the inverter 23 will cause the inverter to present a negative voltage at the output terminal thereof; similarly, a negative voltage applied to the input terminal of the inverter will yield a positive voltage at the output terminal thereof. Monostable circuit 22 is connected to logical gate 26. The signal from the read head is connected through terminal 30 to a logical gate 32. Logical gates 24, 26, and 32 may be described as AND-gate. An AND-gate provides the logical operation of Conjunction for positive signals applied thereto; therefore, AND-gates 24, 26, and 32 will provide a positive output signal only when all of the input signals thereto are positive. The signal from the read head is combined in the logical gate 32 with a signal from a bistable circuit 34. The output signal of logical gate 32 is applied to one of the inputs of the bistable circuit 34 and to the two logical gates 24 and 26. The bistable circuit 34 may also be provided with a synchronizing signal from the clock system shown in FIG. 1. Bistable circuit 34 may be any bistable device which, upon receipt of an appropriate signal at one input terminal thereof, and a clock pulse, will assume one bistable state, and may be triggered to the other stable state at the next clock pulse by applying a corresponding signal at the other of its input terminals. The particular bistable circuit illustrated includes a set input terminal (S), a reset terminal (R), a clock terminal (C), a 1-output terminal, and a 0-output terminal. A positive voltage level applied to either the set or the reset terminals causes the bistable circuit to assume the 1 or 0 state respectively at the receipt of the next clock pulse from a clock pulse source. In this manner, the bistable circuit remains in its reset stable state until a positive voltage signal is applied to the set input terminal thereof; the bistable circuit will then assume the set state when the next clock pulse is received.

Circuits that may be utilized for the monostable circuits, inverter, logical gates, and bistable circuit are well known to those skilled in the art; representative circuits suitable for use in the present invention are shown in application Serial No. 110,373, filed May 16, 1961, and application Serial No. 204,309, filed June 22, 1962, both of which are assigned to the assignee of the present invention.

The operation of the circuit of FIG. 2 may best be described by reference to the waveforms of FIG. 3. When a signal from the counter is applied to terminal 20, monostable circuits 21 and 22 assume an unstable state. Accordingly, the output signal of each of the monostable circuits assumes a negative value. The negative potential provided by the monostable circuit 22 is applied directly to AND-circuit 26. The negative signal from the monostable circuit 21 is applied to the inverter 23 which therefore provides a positive output signal to the AND-gate 24. Thus, AND-circuit 24 has one positive potential applied thereto, thereby rendering it susceptible to the generation of a signal if a second positive potential is applied thereto. AND-gate 26 has a negative potential applied at one input thereof and is therefore incapable of generating a signal while this negative voltage exists. During the interval that both monostable circuits 21 and 22 are in the unstable state, it may therefore be seen that a signal applied to terminal 30 from the read head, and passing through the AND-gate 32, will be applied to both the AND-circuits 24 and 26 and thus generate a signal in the AND-gate 24 to indicate that the storage media velocity is too fast (i.e., the bit recorded by the write head was received too soon). After a predetermined time delay, determined by the delay time of the monostable circuit 21 (300 microseconds for example), monostable circuit 21 will return to its stable state, and the output signal thereof will assume a positive voltage level. Accordingly, the output signal of the inverter will assume a negative voltage level, and the negative voltage applied to the AND-gate 24 will inhibit the generation of a signal therein. Therefore, during the interval of time that monostable circuit 21 is in its stable state, and monostable circuit 22 is in its unstable state, both of the AND-gates 24 and 26 have one of the inputs thereof at a negative voltage level. With these voltage levels existing, neither of the AND-gates can generate a signal; accordingly, if a signal is applied to terminal 30 from the read head, and applied to the AND-gates 24 and 26, no signal will be generated, therefore indicating that the storage media velocity is acceptable.

After a second predetermined time, determined by the delay time of the monostable circuit 22 (400 microseconds for example), the monostable circuit 22 returns to its stable state, and the output signal thereof resumes a positive level. This positive voltage is applied to the AND-gate 26, thereby making this AND-gate susceptible to the generation of a signal when the second input terminal thereof received a positive voltage signal. Accordingly, if the signal is received from the read head and applied to terminal 30, and supplied to the AND-gate 26 after the monostable circuit 22 assumes a stable state, a signal will be generated in the AND-gate 26 to indicate the storage media velocity is too slow (i.e., the bit was detected by the read head too late).

The bistable circuit 34 may conveniently be utilized to gate the signals, produced by the AND-gates 24 and 26, off. Accordingly, when a signal is received from the read head, and applied to terminal 30, it is applied to an AND-gate 32. The other input terminal of the AND-gate 32 is supplied by the 0-output of the bistable circuit 34. When a signal is received from the AND-gate 32 and applied to the set input of the bistable circuit 34, the bistable circuit assumes the set state, and the 1-output thereof assumes a positive 6 volt level. When the next clock pulse is applied to the clock terminal, bistable circuit 34, having a positive signal applied to the reset terminal thereof from the 1-output terminal thereof, will assume the reset state. Accordingly, a positive signal will be reapplied to the AND-gate 32. In this manner, a signal from the read head applied to terminal 30 is applied to AND-gates 24 and 26 for only the period determined by the time that the bistable circuit 34 remains in a set state. The time that bistable circuit remains in a set state is one clock period. Thus, bistable circuit 34 provides a means for limiting the duration of any signal produced by AND-gates 24 and 26 to the duration of one clock period.

Figure 4:
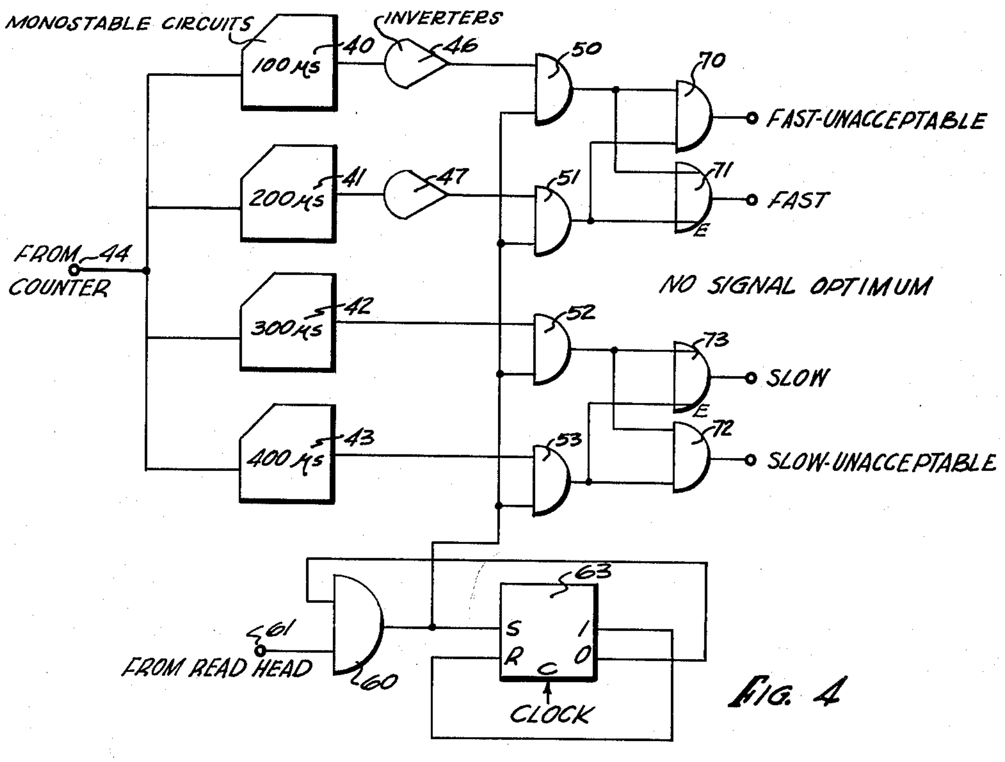
FIG. 4 is a modification of the logic diagram of FIG. 2.

Referring to FIG. 4, a modification of the circuit of FIG. 2 is shown utilizing four monostable circuits 40, 41, 42, and 43. The monostable circuits are supplied with a signal from the counter through an input terminal 44. Monostable circuits 40 and 41 are connected to inverters 46 and 47 respectively. The output terminals of the inverters 46 and 47 are connected respectively to one input terminal of AND-gates 50 and 51. The output terminals of monostable circuits 42 and 43 are connected respectively to one input terminal of AND-gates 52 and 53. The signal received from the read head is connected to an AND-gate 60 through an input terminal 61. The signal from the read head applied to the AND-gate 60 is combined therein with a signal from the 0-output terminal of a bistable circuit 63. The output signal from the AND-gate 60 is applied simultaneously to AND-gates 50–53. The output terminals of AND-gates 50 and 51 are connected to AND-gates 70 and to an Exclusive-OR circuit 71; similarly, output terminals of the AND-gates 52 and 53 are connected to AND-gates 72 and Exclusive-OR circuit 73. The output signals provided by logical gates 70–73 provide an indication of the acceptability of the storage media velocity.

Circuits 71 and 73 may be any logical circuit for implementing the logical function of Exclusive-OR. Thus, Exclusive-OR circuits 71 and 73 provide positive output signals when one, and only one, of the input signals applied thereto is positive. Circuits for providing the Exclusive-OR function are well known to those skilled in the art.

Figure 5:
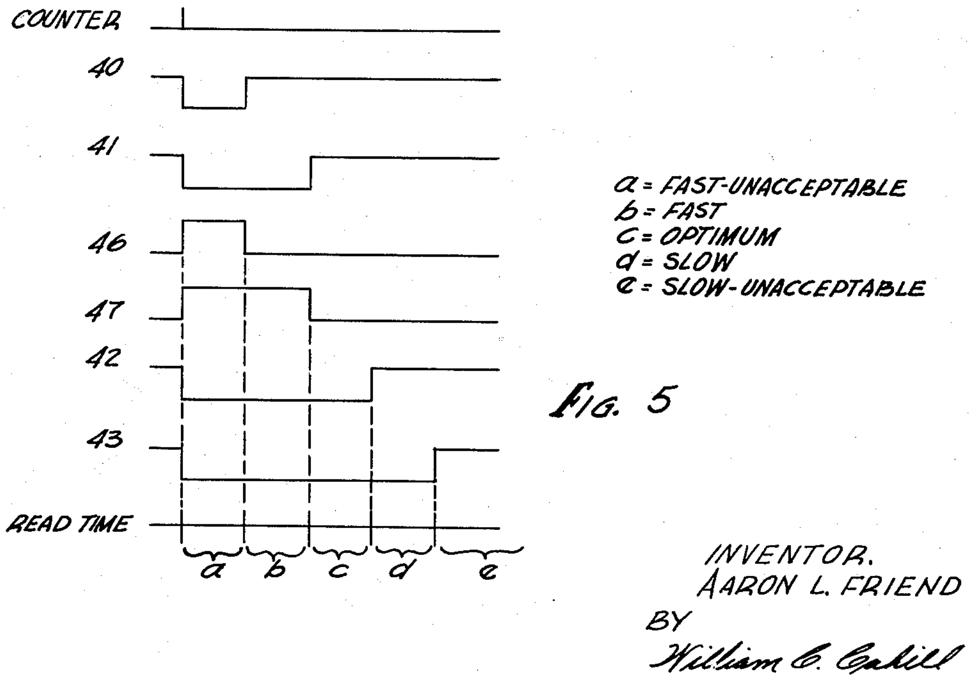
FIG. 5 shows several waveforms useful for the description of the operation of the logic diagram of FIG. 4.

The operation of the circuit of FIG. 4 may be described with the aid of waveforms of FIG. 5. When a bit is written on the storage media by the write head, the counter (FIG. 1) counts a predetermined number of clock pulses. After the predetermined number has been counted, a signal is supplied by the counter to the terminal 44. Accordingly, each of the monostable circuits 40–43 assumes an unstable state. Upon assuming the unstable state, the monostable circuits provide a negative voltage at their respective output terminals. The negative voltage from monostable circuits 42 and 43 are applied to AND-gates 52 and 53 and therefore prohibit the generation of signals in these two AND-gates. The negative voltages provided by monostable circuits 40 and 41 are applied to inverters 46 and 47, which therefore supply positive voltage signals to AND-gates 50 and 51, respectively. Since AND-gates 50 and 51 have positive voltages applied at one input terminal thereof, the application of a second positive voltage at the input of either of these AND-gates will cause a generation of a positive voltage signal at the output terminal thereof.

Each of the monostable circuits will assume their respective stable states upon the expiration of the predetermined time delays of each (100, 200, 300, and 400 microseconds respectively for example). Accordingly, monostable circuit 40 will resume a stable state first. Monostable circuit 41 will assume a stable state second, monostable circuit 42 third, and monostable circuit 43 fourth. If a read signal is received from the read head and applied to terminal 61, and thus applied simultaneously to AND gates 50–53, while all of the monostable circuits are in their unstable state, AND-gates 50 and 51 will each provide a positive voltage signal at their output terminals. Accordingly, AND-gate 70 will have two positive voltage signals applied at the input thereof and will thus provide a positive voltage at the output thereof to indicate that the velocity of the storage media is fast, and unacceptable. If a read signal is received from the read head and applied to terminal 61 after the monostable circuit 40 has resumed the stable state, but before monostable circuits 41–43 have resumed their stable states, AND-gate 51 will have applied thereto two positive voltage signals and will therefore generate a positive voltage signal and apply that signal to the Exclusive-OR circuit 71. Exclusive-OR circuit 71 will thus provide a positive voltage signal at the output terminal thereof to indicate that the storage media velocity is fast, but nevertheless acceptable.

If a read signal from the read head is applied to terminal 61 after monostable circuits 40 and 41 have resumed the stable state, but before monostable circuits 42 and 43 have assumed a stable state, none of the AND-gates 50–53 will have a positive voltage signal applied thereto from their respective monostable circuits, and thus no signal will be generated by any of these AND-gates. Accordingly, no signal will be produced by the AND-gate and no signal be presented to the output of the circuit of FIG. 4. The absence of a signal may indicate that the storage media velocity is at its optimum value.

If a read signal from the read head is applied to terminal 61 after monostable circuits 40–42 have resumed the stable state and before monostable circuit 43 has assumed the stable state, AND-gate 52 will have positive voltage signals applied to both input terminals thereof, and will therefore generate a positive voltage signal and apply that signal to the Exclusive-OR circuit 73. Accordingly, Exclusive-OR circuit 73 will provide a positive voltage signal to indicate that the storage media velocity is slow, but nevertheless acceptable. Similarly, if a read signal from the read head is applied to terminal 61 after all of the monostable circuits have resumed their stable states, AND-gates 52 and 53 will generate positive voltage signals which will be combined in AND-gate 72 to provide a positive voltage signal at the output terminal thereof, thus indicating that the storage media velocity is slow and unacceptable.

The bistable circuit 63 may be utilized for the same purpose as the bistable circuit 34 (FIG. 2). The duration of the signal derived from the circuit of FIG. 4 may therefore be determined by the time required for the bistable circuit 63 to resume the reset state after assuming the set state. Accordingly, the output signals provided by the circuit of FIG. 4 may be limited to the duration of a clock period and thus be made to correspond to the logical signal durations present in the data processing system in which the present invention is utilized.

While the principles of the invention have now been made clear in illustrative embodiments, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are, therefore, intended to cover and embrace any such modifications, within the limits only of the true spirit and scope of the invention.

What is claimed as new and desired to secure by Letters Patent of the United States is:

1. Apparatus for determining the acceptability of storage media velocity comprising, means for writing a binary bit on said storage media, a counter connected to said means for generating a first signal at a predetermined time after said binary bit is wirtten, a monostable timing means connected to receive said first signal and adapted to assume an unstable timing state for a predetermined time upon receipt of said first signal, reading means for detecting said binary bit on staid storage media and for generating a second signal in response thereto, gating means connected to said timing means and to said reading means, said gating means adapted to generate an error signal in response to said second signal when said timing means is not in said timing state.

2. Apparatus for determining the acceptability of storage media velocity comprising, means for writing a binary bit on said storage media, a counter connected to said means for generating a first signal at a predetermined time after said binary bit is written, a plurality of monostable circuits connected to receive said first signal and adapted to switch from a stable state to an unstable state each for a different predetermined time in response to said first signal, reading means for detecting said binary bit on said storage media and for generating a second signal in response thereto, gating means connected to said monostable circuits and to said reading means, said gating means adapted to generate error signals in response to said second signal when other than a predetermined number of said monostable circuits have returned to their respective stable state.

3. Apparatus for determining the acceptability of storage media velocity comprising, means for writing a binary bit on said storage media, a counter connected to said means for generating a first signal at a predetermined time after said binary bit is written, timing means connected to receive said first signal and adapted to assume a timing state for a predetermined time upon receipt of said first signal, reading means for detecting said binary bit on said storage media and for generating a second signal in response thereto, a plurality of AND-gates each having one input terminal thereof connected to said timing means and another input terminal thereof connected to said reading means, said AND-gates adapted to generate an error signal in response to said second signal when said timing means is not in said timing state.

4. Apparatus for determining the acceptability of storage media velocity comprising, means for writing a binary bit on said storage media, a counter connected to said means for generating a first signal at a predetermined time after said binary bit is written, a plurality of monostable circuits connected to receive said first signal and adapted to switch from a stable state to an unstable state each for a different predetermined time in response to said first signal, reading means for detecting said binary bit on said storage media and for generating a second signal in response thereto, a plurality of AND-gates each having one input terminal thereof connected to a corresponding one of said monostable circuits and another input terminal thereof connected to said reading means, said AND-gates adapted to generate an error signal in response to said second signal when other than a predetermined number of said monostable circuits have returned to their respective stable state.

5. Apparatus for determining the acceptability of storage media velocity comprising, writing means for writing a binary bit on said storage media, a counter connected to said means and actuated thereby for generating a first signal at a predetermined time after said binary bit is written, reading means for reading said binary bit on said storage media and adapted to generate a second signal when said binary bit is read, and means connected to receive said first and second signals for generating an error signal when said second signal is not received within a predetermined time after said first signal.

6. Apparatus for determining the acceptability of magnetic tape velocity comprising, a source of clock pulses, a write head for magnetically polarizing a discrete portion of said magnetic tape to represent a binary bit, a counter connected to said clock pulse source and to said write head for energizing said write head and for generating a first signal at a predetermined number of clock pulses after energizing said write head, timing means connected to receive said first signal and adapted to assume a timing state for a predetermined time upon receipt of said signal, a read head for detecting said magnetically polarized portion of said magnetic tape and adapted to generate a second signal in response thereto, gating means connected to said timing means and to said read head for generating an error signal in response to said second signal when said timing means has not assumed said timing state.

7. Apparatus for determining the acceptability of magnetic tape velocity comprising, a source of clock pulses, a write head for magnetically polarizing a discrete portion of said magnetic tape to represent a binary bit, a counter connected to said clock pulse source and to said write head for energizing said write head and for generating a first signal at a predetermined number of clock pulses after energizing said write head, a plurality of monostable circuits connected to receive said first signal and adapted to switch from a stable state to an unstable state each for a different predetermined time in response to said first signal, a read head for detecting said magnetically polarized portion of said magnetic tape and adapted to generate a second signal in response thereto, gating means connected to said monostable circuits and to said read head, said gating means adapted to generate error signals in response to said second signal when other than a predetermined number of said monostable circuits have returned to their respective stable state.

8. Apparatus for determining the acceptability of magnetic tape velocity comprising, a source of clock pulses, a write head for magnetically polarizing a discrete portion of said magnetic tape to represent a binary bit, a counter connected to said clock pulse source and to said write head for energizing said write head and for generating a first signal at a predetermined number of clock pulses after energizing said write head, a plurality of monostable circuits connected to receive said first signal and adapted to switch from a stable state to an unstable state each for a different predetermined time in response to said signal, a read head for detecting said magnetically polarized portion of said magnetic tape and adapted to generate a second signal in response thereto, a plurality of AND-gates each having one input terminal thereof connected to said monostable circuits and another input terminal thereof connected to said read head, said AND-gates adapted to generate an error signal in response to said second signal when other than a predetermined number of said monostable circuits have returned to their respective stable state.

References Cited by the Examiner

UNITED STATES PATENTS 2,968,803 1/61 Lindley ............ 340—174.1

IRVING L. SRAGOW, *Primary Examiner.*